United States Patent
O'Connell

(10) Patent No.: US 6,177,866 B1
(45) Date of Patent: Jan. 23, 2001

(54) TAILGATING WARNING SYSTEM

(76) Inventor: Patricia O'Connell, 5207 Lincoln Ave., Los Angeles, CA (US) 90042

( * ) Notice: Under 35 U.S.C. 154(b), the term of this patent shall be extended for 0 days.

(21) Appl. No.: 09/322,347

(22) Filed: May 28, 1999

(51) Int. Cl.[7] .................................................. B60Q 1/54
(52) U.S. Cl. ........................ 340/466; 340/463; 340/467; 340/903
(58) Field of Search .................... 340/463, 464, 340/466, 467, 468, 472, 435, 470, 479, 903, 904

(56) References Cited

U.S. PATENT DOCUMENTS

| | | | |
|---|---|---|---|
| 3,868,629 | * | 2/1975 | Caine ................................ 340/463 |
| 3,950,098 | * | 4/1976 | Caine ................................ 340/463 |
| 4,176,483 | * | 12/1979 | Bailey ................................ 40/467 |
| 4,631,516 | * | 12/1986 | Clinker ............................... 340/464 |
| 5,604,480 | * | 2/1997 | Lamparter ........................ 340/470 |
| 5,652,565 | * | 7/1997 | Salcddas et al. ................ 340/479 |
| 5,725,075 | * | 3/1998 | Chou ................................. 340/463 |
| 5,808,728 | * | 11/1998 | Uehara .............................. 340/903 |
| 5,838,259 | * | 11/1998 | Tonkin .............................. 340/903 |

\* cited by examiner

*Primary Examiner*—Van T. Trieu
(74) *Attorney, Agent, or Firm*—Goldstein & Canino

(57) ABSTRACT

A tailgating warning system including a housing having a rearward face and a forward face. The forward face has a clear window therein exposing a hollow interior of the housing. The rearward face is comprised of a transparent lens. The housing has an interior lens disposed inwardly of the rearward face. The interior lens has flashing indicia disposed thereon. The housing has lights disposed therein. A photo-electric cell is disposed within the housing and is directed outwardly of the rearward face. The photo-electric cell is in communication with the lights and flashing indicia of the housing. The photo-electric cell is in communication with the accelerator of the vehicle whereby activation of the photo-electric cell is achieved only after a predetermined speed is reached by the vehicle.

4 Claims, 2 Drawing Sheets

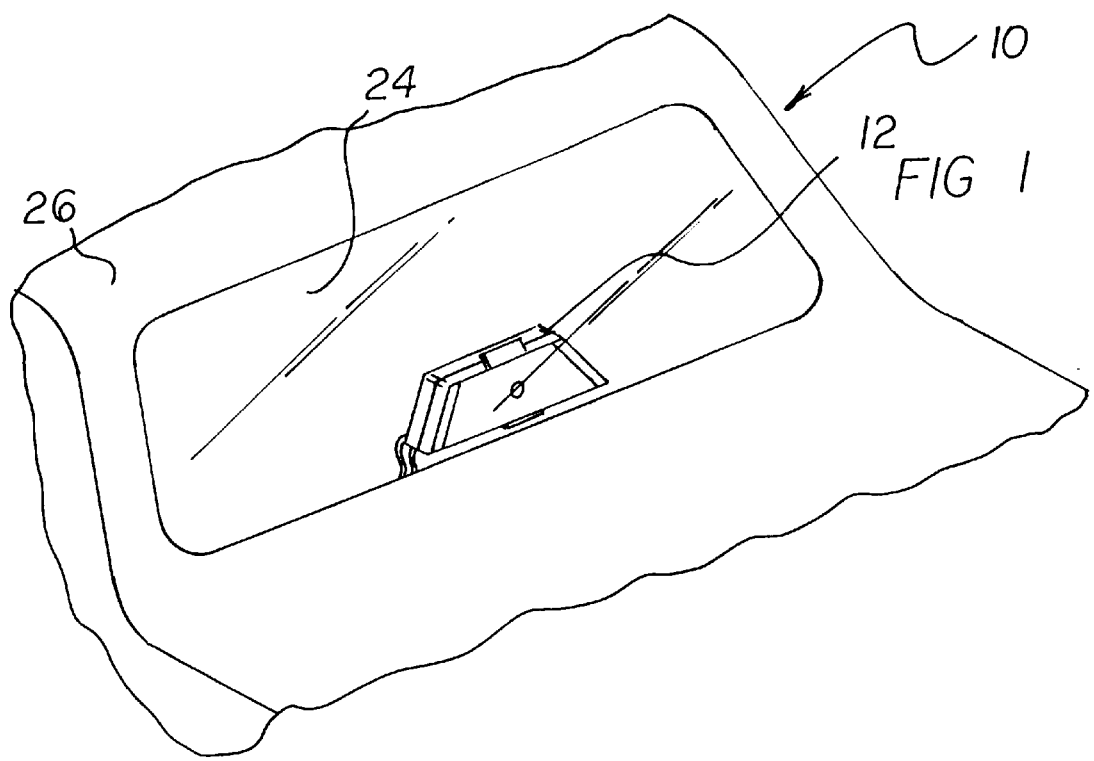
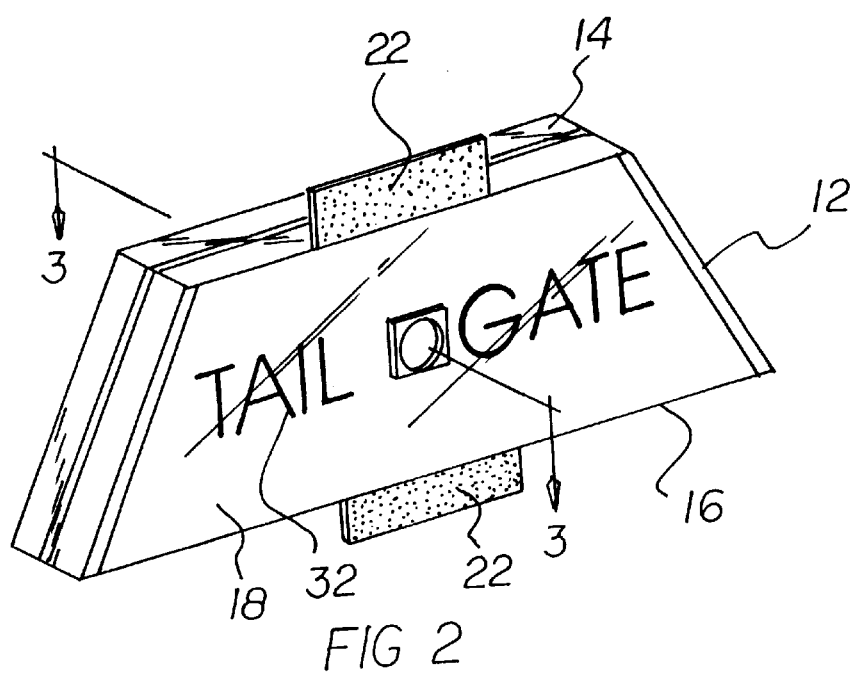

TAILGATING WARNING SYSTEM

BACKGROUND OF THE INVENTION

The present invention relates to a tailgating warning system and more particularly pertains to measuring the closeness of a following vehicle and alerting them when they are too close.

The problem of tailgating has become more prevalent in today's hurried lifestyle. People drive their cars faster in attempt to get to where they are going as quickly as possible. This often results in driving too closely to another vehicle and sometimes an accident. There is very little one driver can do to alert the vehicle behind them that they are driving too close for their comfort. The only thing the driver can do is make so type of hand gesture to signal to the close driving vehicle. However, these gestures are ambiguous to the close driving driver. Another option would have the driver who is being tailgated to pull over and let the tailgating driver past. The all-too-frequent option is an altercation of some type.

The present invention seeks to solve these problems by providing a light that is mounted to the rear window of the vehicle with a photo-electric cell to measure the distance a vehicle traveling behind is relative to your vehicle. Once an unsafe distance is detected, a warning light will illuminate telling the driver behind your vehicle that they are too close to your vehicle. This will cause the following vehicle to slow down.

The use of warning lights for vehicles is known in the prior art. More specifically, warning lights for vehicles heretofore devised and utilized for the purpose of alerting a driver of a vehicle of a problem are known to consist basically of familiar, expected and obvious structural configurations, notwithstanding the myriad of designs encompassed by the crowded prior art which have been developed for the fulfillment of countless objectives and requirements.

While these devices fulfill their respective, particular objective and requirements, these patents do not describe a tailgating warning system for measuring the closeness of a following vehicle and alerting them when they are too close.

In this respect, the tailgating warning system according to the present invention substantially departs from the conventional concepts and designs of the prior art, and in doing so provides an apparatus primarily developed for the purpose of measuring the closeness of a following vehicle and alerting them when they are too close.

Therefore, it can be appreciated that there exists a continuing need for new and improved tailgating warning system which can be used for measuring the closeness of a following vehicle and alerting them when they are too close. In this regard, the present invention substantially fulfills this need.

SUMMARY OF THE INVENTION

In the view of the foregoing disadvantages inherent in the known types of warning lights for vehicles now present in the prior art, the present invention provides an improved tailgating warning system. As such, the general purpose of the present invention, which will be described subsequently in greater detail, is to provide a new and improved tailgating warning system and method which has all the advantages of the prior art and none of the disadvantages.

To attain this, the present invention essentially comprises a housing having a generally trapezoidal configuration defined by a short upper end and a wide lower end. The housing has a rearward face and a forward face. The upper and lower ends each have a flexible mounting bracket extending outwardly therefrom for securement to a rear window of a vehicle. The forward face has a clear window therein exposing a hollow interior of the housing. The rearward face is comprised of a transparent lens. The housing has an interior lens disposed inwardly of the rearward face. The interior lens has flashing indicia disposed thereon. The housing has lights disposed therein. A photo-electric cell is disposed within the housing and is directed outwardly of the rearward face. The photo-electric cell is in communication with the lights and flashing indicia of the housing. The photo-electric cell is in communication with the accelerator of the vehicle whereby activation of the photo-electric cell is achieved only after a predetermined speed is reached by the vehicle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tailgating warning system which has all the advantages of the prior art warning lights for vehicles and none of the disadvantages.

It is another object of the present invention to provide a new and improved tailgating warning system which may be easily and efficiently manufactured and marketed.

It is a further object of the present invention to provide a new and improved tailgating warning system which is of durable and reliable construction.

An even further object of the present invention is to provide a new and improved tailgating warning system which is susceptible of a low cost of manufacture with regard to both materials and labor, and which accordingly is then susceptible of low prices of sale to the consuming public, thereby making such a tailgating warning system economically available to the buying public.

Even still another object of the present invention is to provide a new and improved tailgating warning system for measuring the closeness of a following vehicle and alerting them when they are too close.

Lastly, it is an object of the present invention to provide a new and improved tailgating warning system including a housing having a rearward face and a forward face. The forward face has a clear window therein exposing a hollow interior of the housing. The rearward face is comprised of a transparent lens. The housing has an interior lens disposed inwardly of the rearward face. The interior lens has flashing indicia disposed thereon. The housing has lights disposed therein. A photo-electric cell is disposed within the housing and is directed outwardly of the rearward face. The photo-electric cell is in communication with the lights and flashing indicia of the housing. The photo-electric cell is in communication with the accelerator of the vehicle whereby activation of the photo-electric cell is achieved only after a predetermined speed is reached by the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the tailgating warning system constructed in accordance with the principles of the present invention.

FIG. 2 is a rear perspective view of the present invention illustrated detached from the vehicle.

The same reference numerals refer to the same parts through the various figures.

DESCRIPTION OF THE PREFERRED EMBODIMENT

Figure 3:
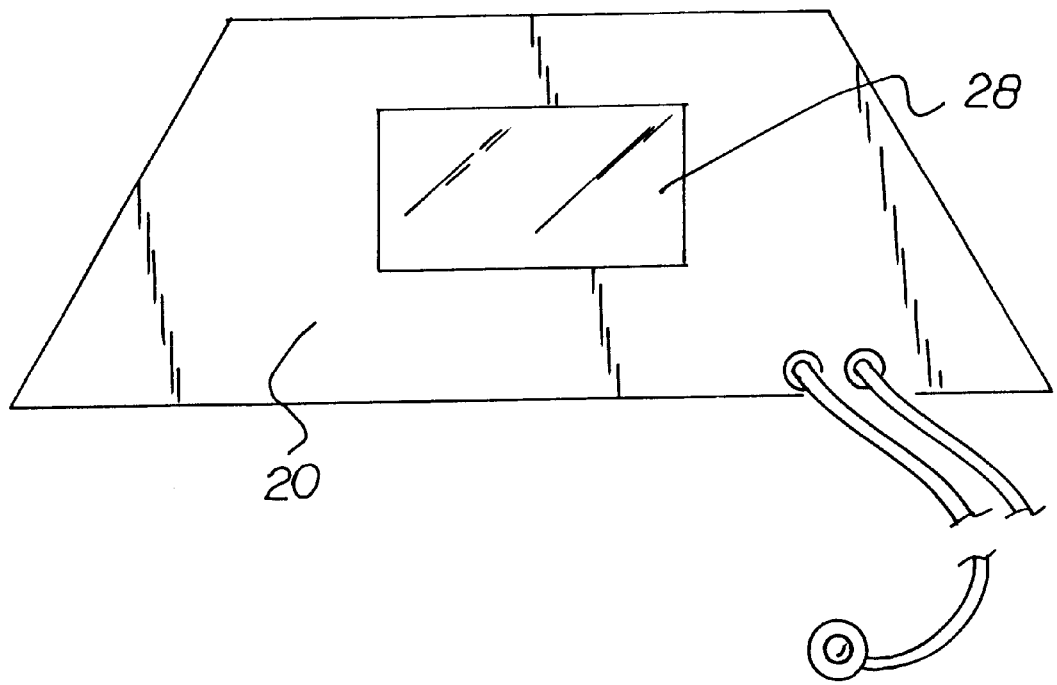
FIG. 3 is a front view of the present invention.
Figure 4:
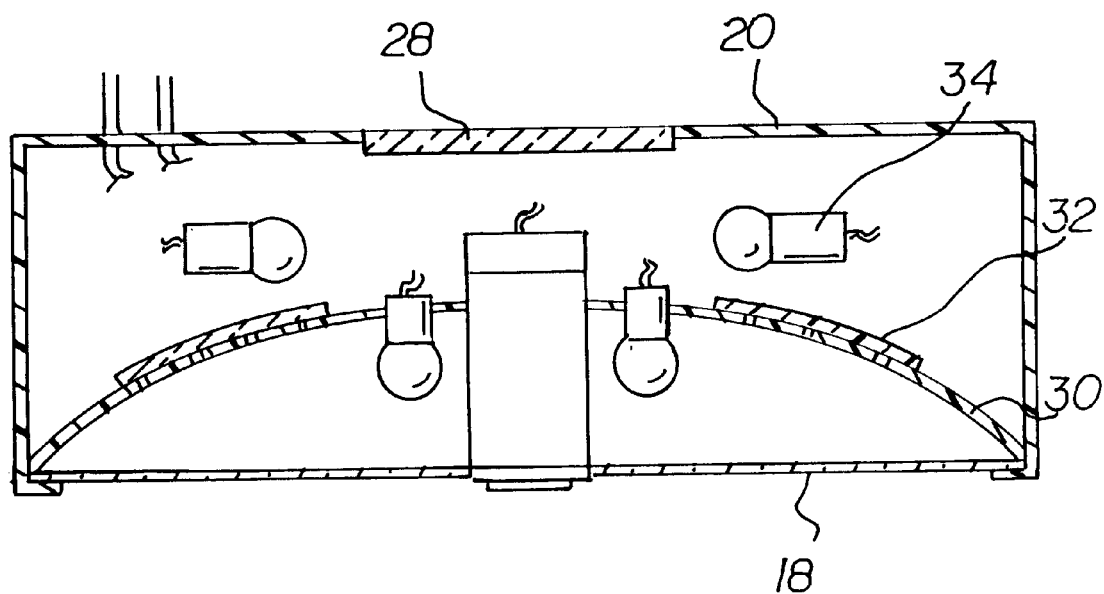
FIG. 4 is a cross-sectional view of the present invention as taken along line 3—3 of FIG. 2.

With reference now to the drawings, and in particular, to FIGS. 1 through 4 thereof, the preferred embodiment of the new and improved tailgating warning system embodying the principles and concepts of the present invention and generally designated by the reference number 10 will be described.

Specifically, it will be noted in the various Figures that the device relates to a tailgating warning system for measuring the closeness of a following vehicle and alerting them when they are too close. In its broadest context, the device consists of a housing and a photo-electric cell. Such components are individually configured and correlated with respect to each other so as to attain the desired objective.

The housing 12 has a generally trapezoidal configuration defined by a short upper end 14 and a wide lower end 16. The housing 12 has a rearward face 18 and a forward face 20. The upper 16 and lower ends 14 each have a flexible mounting bracket 22 extending outwardly therefrom for securement to a rear window 24 of a vehicle 26. The mounting brackets 22 could be coated with an adhesive or similar securement means to facilitate securement to the rear window 24. The forward face 20 has a clear window 28 therein exposing a hollow interior of the housing 12. The forward face 20, with the housing 12 in place, faces the interior of the vehicle 26, thus, the driver will be able to see through the window 28 in order to determine whether the device 10 is activated. The rearward face 18 is comprised of a transparent lens. The housing has an interior lens 30 disposed inwardly of the rearward face 18. The interior lens 30 has flashing indicia 32 disposed thereon. The flashing indicia 32 preferably spells out the phrase "TAIL GATE", or spell out some other word that will convey a similar message. The housing 12 has lights 34 disposed therein. The lights 34 will further illuminate the housing 12.

The photo-electric cell 36 is disposed within the housing 12 and is directed outwardly of the rearward face 18. The photo-electric cell 36 is in communication with the lights 34 and flashing indicia 32 of the housing 12. The photo-electric cell 36 is in communication with the accelerator of the vehicle 26 whereby activation of the photo-electric cell 36 is achieved only after a predetermined speed is reached by the vehicle 26. In the preferred embodiment, the preferred speed is twenty-seven miles per hour. Additionally, the photo-electric cell will incorporate a delay of three seconds before activating to compensate for lane changes.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A tailgating warning system for measuring the closeness of a following vehicle and alerting them when they are too close comprising, in combination:

a housing having a generally trapezoidal configuration defined by a short upper end and a wide lower end, the housing having a rearward face and a forward face, the upper and lower ends each having a flexible mounting bracket extending outwardly therefrom for securement to a rear window of a vehicle, the forward face having a clear window therein exposing a hollow interior of the housing, the rearward face being comprised of a transparent lens, the housing having an interior lens disposed inwardly of the rearward face, the interior lens having flashing indicia disposed thereon, the housing having lights disposed therein;

a photo-electric cell disposed within the housing and being directed outwardly of the rearward face, the photo-electric cell being in communication with the lights and flashing indicia of the housing, the photo-electric cell being in communication with the accelerator of the vehicle whereby activation of the photo-electric cell is achieved only after a predetermined speed is reached by the vehicle.

2. A tailgating warning system for measuring the closeness of a following vehicle and alerting them when they are too close comprising, in combination:

a housing having a rearward face and a forward face, the forward face having a clear window therein exposing a hollow interior of the housing, the rearward face being comprised of a transparent lens, the housing having an interior lens disposed inwardly of the rearward face, the interior lens having flashing indicia disposed thereon, the housing having lights disposed therein;

a photo-electric cell disposed within the housing and being directed outwardly of the rearward face, the photo-electric cell being in communication with the lights and flashing indicia of the housing, the photo-electric cell being in communication with the accelerator of the vehicle whereby activation of the photo-electric cell is achieved only after a predetermined speed is reached by the vehicle.

3. The tailgating warning system as set forth in claim 2 wherein the housing has a generally trapezoidal configuration defined by a short upper end and a wide lower end.

4. The tailgating warning system as set forth in claim 2 wherein upper and lower ends of the housing each have a flexible mounting bracket extending outwardly therefrom for securement to a rear window of a vehicle.

\* \* \* \* \*